(12) United States Patent
Talnykin et al.

(10) Patent No.: US 6,714,200 B1
(45) Date of Patent: Mar. 30, 2004

(54) METHOD AND SYSTEM FOR EFFICIENTLY STREAMING 3D ANIMATION ACROSS A WIDE AREA NETWORK

(75) Inventors: Eduard Talnykin, Sherman Oaks, CA (US); Shinya Matsuoka, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/519,309

(22) Filed: Mar. 6, 2000

(Under 37 CFR 1.47)

(51) Int. Cl.<sup>7</sup> ............................................. G06T 13/00
(52) U.S. Cl. ...................................................... 345/473
(58) Field of Search ................................ 345/473, 474, 345/475, 619; 375/240.18

(56) References Cited

U.S. PATENT DOCUMENTS 5,822,004 A * 10/1998 Crocitti et al. ......... 375/240.18
6,351,267 B1 * 2/2002 Gever et al. ................. 345/473

OTHER PUBLICATIONS

Watt et al (Advanced Animation and Rendering Techniques: Theory and Practice: sections 16.4.1 & 16.4.2: 1992: ISBN: 0–201 54412–1).*

3D Studio Max Tutorials (ISBN: 12801–000000–5040: 1996; chapter 11).*

Mahoney ("A New Stream of thought for Delivering Web Animation": Diana Phillips Mahoney, Computer Graphics World, 22, 4, 14(1): Apr. 1999, ISSN: 0271–4159).*

* cited by examiner

*Primary Examiner*—Almis R. Jankus
(74) *Attorney, Agent, or Firm*—Woodcock Washburn LLP (57) ABSTRACT

A method for providing 3D animation via a network in a client/server computer system. A 3D model is accessed on the client. The client then receives a series of transform updates for the 3D model via a network. The series of transform updates described for the client the manner in which to update the 3D model to implement the animation. Each of the series of transform updates are applied by the client to the 3D model to render a corresponding series of 3D images. The series of rendered 3D images are then displayed to the user to provide a 3D animation. The transform updates are streamed from the server to the client via the network. Streaming the transform updates across the network is more bandwidth efficient than streaming images. Interactivity is implemented by receiving user commands from the client via the network. In response to the user commands, the server appropriately alters the series of transform updates streamed to the user, thereby providing interactivity to the 3D animation.

35 Claims, 6 Drawing Sheets

METHOD AND SYSTEM FOR EFFICIENTLY STREAMING 3D ANIMATION ACROSS A WIDE AREA NETWORK

FIELD OF THE INVENTION

The field of the present invention pertains to 3D computer graphics. More particularly, the present invention relates to a method and system for the efficient streaming of 3D animation for computer systems on a network.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices.

Graphics have also become a key technology for communicating ideas, data, and trends in most areas of commerce, science, and education. Modern graphics workstations often implement real time user interaction with three dimensional (3D) models and pseudo-realistic images. These workstations typically contain dedicated, special purpose graphics hardware. The progress of semiconductor fabrication technology has made it possible to do real time 3D animation, with color shaded images of complex objects, described by thousands of polygons, on powerful dedicated rendering subsystems. The most recent and most powerful workstations are capable of rendering completely life-like, realistically lighted, 3D objects and structures.

One of the most powerful methods of communicating ideas and information is through the use of video, particularly, interactive video. The most commonly used means of disseminating video, the television, has become quite ubiquitous. However, most applications involving the widespread use of interactive video have centered upon the use of computer systems (e.g., desktop computer systems, digital set-top boxes, and the like) coupled via communications networks.

The computer systems provide the platforms for receiving and rendering the video information. In addition, the computer systems provide the interactive aspects and functionality which distinguish interactive video applications from more traditional video applications (e.g., television). The video information is provided to the computer system platforms via a communications network.

The Internet has emerged as the most important and most ubiquitous such communication network, although the communication network can be any of several different forms (e.g., company-wide ethernet networks, intranets, etc.). Video applications envision the dissemination of video information to computer equipped users via the Internet.

Unfortunately, most users are coupled to the Internet via a narrow band connection, typically a telephone modem. The narrow band connection limits the quality of the video information which can be transferred to the user. For example, 30 seconds of television quality video can require a user to endure a video data download of an hour or more across a telephone modem (e.g., 56K modem).

In an effort to ameliorate this problem, many Internet video applications employ streaming animation to provide their "video-like" functionality. Streaming animation in such applications is used to bring video characteristics (motion, etc.) to characters or scenes. Streaming animation typically involves the downloading of video data via a network connection and the subsequent rendering of the video data on the user's computer system as the remaining portion of the video data completes its download.

Figure 1:
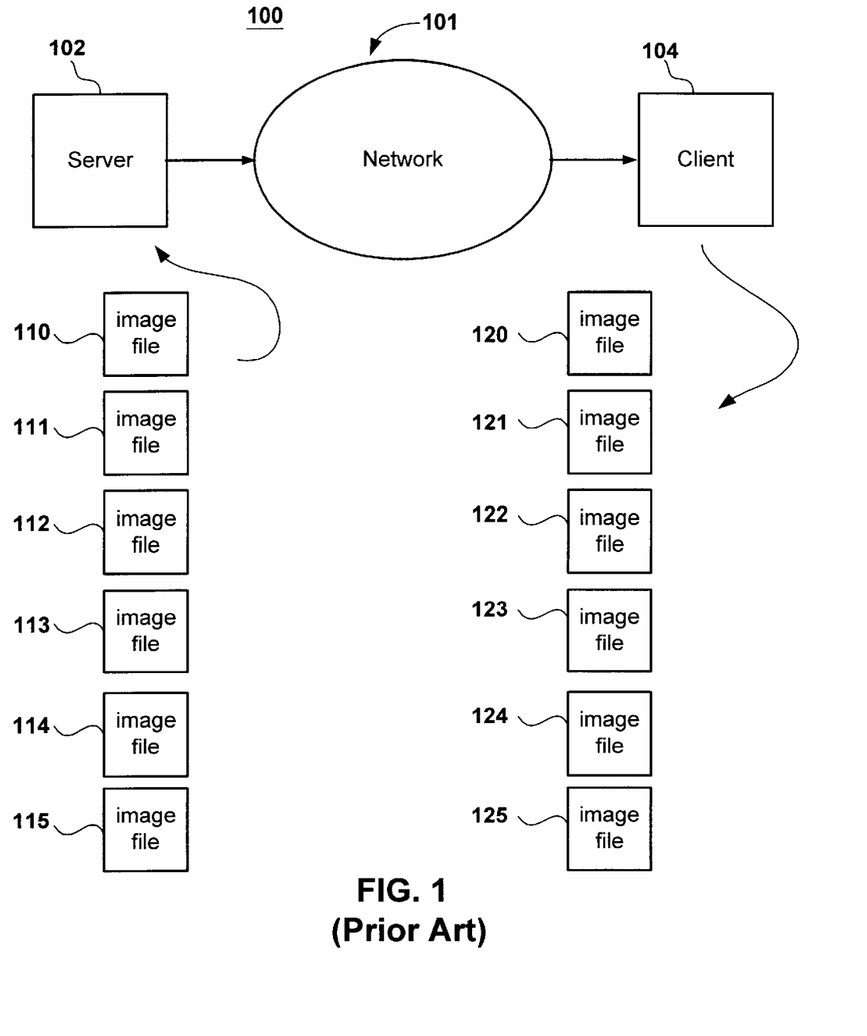
FIG. 1 shows a diagram of a prior art GIF animation streaming animation system.

Prior Art FIG. 1 shows a diagram of a prior art GIF animation streaming animation system 100. As depicted in FIG. 1, system 100 includes a server 102 coupled to a client 104 via a network 101. Server 102 is typically a large computer system residing at the video applications site premises (e.g., an on-line video company). Client 104 is typically a desktop computer system at, for example, the user's home. Network 101 is the Internet.

Prior Art GIF animation uses a streaming animation technique to bring life to, for example, characters or scenes rendered by the client 104. The GIF animation is performed using a series of image files 110–115 (e.g., image files stored using the GIF format). The files 110–115 are individually streamed via network 101 to the client 104. The files 110–115 are received and rendered as image files 120–125 by the client 104. By rendering and displaying the successive image files, client 104 animates to characters or scenes viewed by the user.

GIF animation as depicted in system 100 is a 2D (two-dimensional) animation in that the resulting animated scene is 2D as opposed to 3D (three-dimensional). Examples of 2D animation techniques include Macromedia Flash™ and traditional MPEG animation.

There exists, however, a substantial limitation to the animation techniques embodied by system 100. Due to the narrow band nature of the modem transmission over the Internet network 101, it is very hard to maintain realism and normal motion type animation. Maintaining animation of the quality to which users are accustomed (e.g., television type quality) is extremely difficult when streaming video data over the narrow pipes of the Internet. The quality of the video information greatly suffers. In addition to the loss of video quality, the narrow band nature of the modem transmission makes any real interactivity with an animation extremely difficult.

Thus, what is required is a solution capable of providing high-quality animation over narrow bandwidth connections. The required solution should be capable of providing television quality animation over the typically narrow data pipes of the Internet. What is required is a system that maintains interactivity without impacting the animation quality. In addition, was further required is a system capable of providing 3D animation and interactivity. The present invention provides a novel solution to the above requirements.

SUMMARY OF THE INVENTION

The present invention is a solution capable of providing high-quality animation over narrow bandwidth network connections. The system of the present invention is capable of providing high quality animation over the typically narrow data pipes of the Internet. The system of the present invention maintains interactivity without impacting the animation quality. In addition, the present invention provides a system capable of providing 3D animation and interactivity.

In one embodiment, the present invention is implemented as client/server computer system for providing interactive 3D animation via a network. A 3D model is accessed on the client. The 3D model is a representation of the Figure or scene to be animated (e.g., a 3D model of an athlete, an animal, a vehicle, etc.). The client then receives a series of transform updates for the 3D model via a network. In this embodiment, the network is the Internet and the client (e.g., a desktop computer system) is coupled to the Internet via a narrow bandwidth connection (e.g., telephone modem).

The series of transform updates describe for the client the manner in which to update the 3D model, and thereby implement the animation. The 3D model is instantiated and rendered by dedicated rendering hardware included in the client. Each of the series of transform updates are applied by the client to the 3D model to render a corresponding series of 3D images. The series of rendered 3D images are then displayed to the user to provide a 3D animation. The transform updates are streamed from the server to the client via the network. The user views 3D animation on a display coupled to the client. The user sees the 3D model "come to life" in the manner intended.

Interactivity is implemented by receiving user commands from the client via the network. In response to the user commands, the server appropriately alters the series of transform updates streamed to the user, thereby providing interactivity to the 3D animation. Thus, for example, the user is able to interact with the 3D animation as the 3D animation "responds" to user inputs (e.g., mouse clicks, etc.).

Streaming the transform updates across the Internet is more bandwidth efficient than streaming images using a series of image files. For an additional degree of efficiency, the transform updates themselves can be compressed prior transmission from the server to the client via the network. The compressed transform updates are then decompressed by the client and used to render the corresponding series of 3D images for the animation. In so doing, the client/server computer system of the present invention is capable of providing high-quality, interactive 3D animation over narrow data pipes of the Internet.

BRIEF DESCRIPTION OF THE DRAWINGS

The present invention is illustrated by way of example and not by way of limitation, in the Figures of the accompanying drawings and in which like reference numerals refer to similar elements and in which.

Prior Art

DETAILED DESCRIPTION OF THE INVENTION

In the following detailed description of the present invention, a method and system for efficiently streaming 3D animation across a wide area network, numerous specific details are set forth in order to provide a thorough understanding of the present invention. However, it will be obvious to one skilled in the art that the present invention may be practiced without these specific details and on systems which do not fully implement the depicted architectural details. In other instances well known methods, procedures, components, and circuits have not been described in detail as not to unnecessarily obscure aspects of the present invention. It should also be recognized by one skilled in the art that some aspects of the present invention pertain to graphics subsystems, and as such, can apply not only to graphics computers, but to any computer based image generator, such as, for example, a computer implemented image generator having simple controlling hardware and which connects directly to data base memory or a mass storage device.

Some portions of the detailed descriptions which follow are presented in terms of procedures, logic blocks, processing, and other symbolic representations of operations on data bits within a computer system. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical, optical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering" or "sending" or "processing" or "executing" or "storing" or the like, refer to the action and processes of a computer system (e.g., computer system 200 of FIG. 2), or similar data processing device, that manipulates and transforms data represented as physical (electronic) quantities within the computer system's registers and memories into other data similarly represented as physical quantities within the computer system memories or registers or other such information storage, transmission or display devices.

The present invention is a method and system for providing high-quality animation over narrow bandwidth network connections. The system of the present invention is capable of providing high quality animation over the typically narrow data pipes of the Internet. The system of the present invention maintains interactivity without impacting the animation quality. In addition, the present invention provides a system capable of providing 3D animation and interactivity. In one embodiment, the present invention is implemented as client/server computer system for providing interactive 3D animation via a network. The present invention and benefits are further described below.

Figure 2:
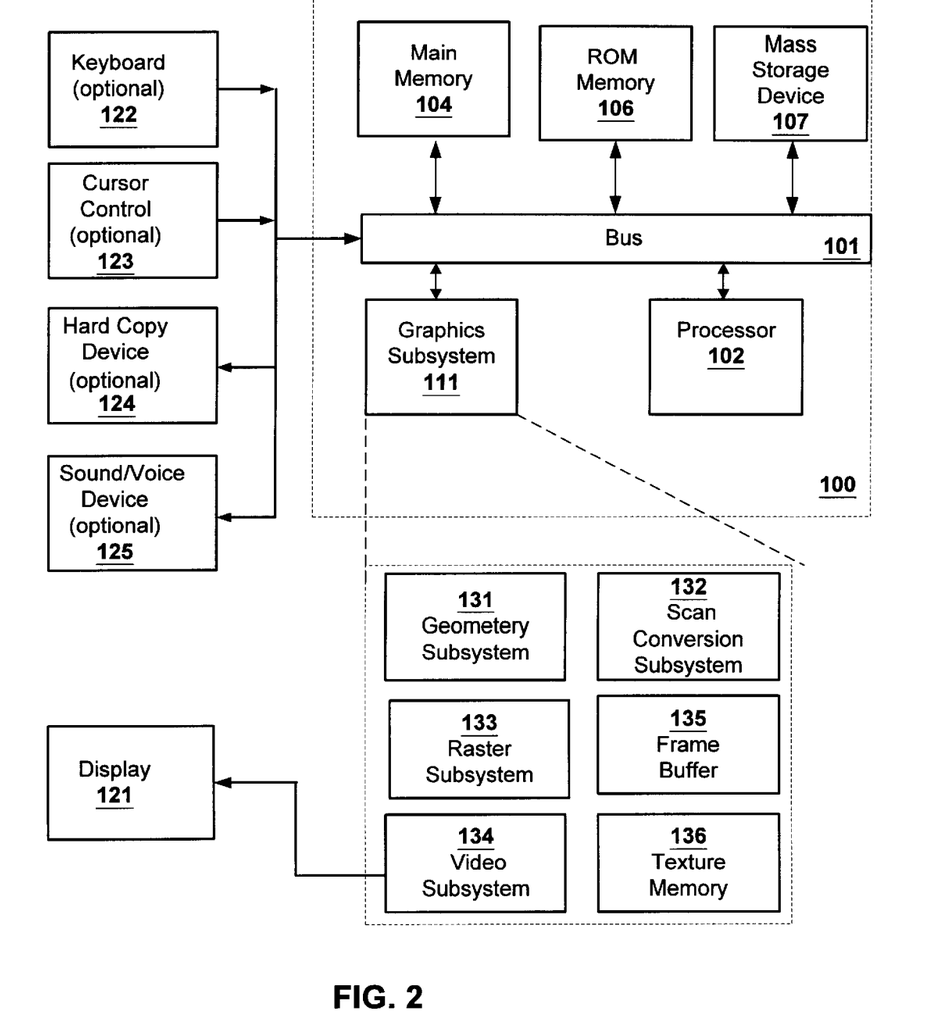
FIG. 2 shows a diagram of a 3D graphics computer system in accordance with one embodiment of the present invention.

Referring now to FIG. 2, a diagram of a 3D graphics computer system 200 in accordance with one embodiment of the present invention is shown. Computer system 200 depicts a basic implementation of a client-side computer system in accordance with the present invention. Computer system 200 includes a bus 201 for transmitting digital information between the various parts of the computer system. One or more microprocessors 202 are coupled to bus 201 for processing information. The information along with the instructions of how the information is to be processed are stored in a hierarchical memory system comprised of mass storage device 207, read only memory 206, and main memory 204. Mass storage device 207 is used to store large amounts of digital data. The mass storage device 207 can consist one or more hard disk drives, floppy disk drives, optical disk drives, tape drives, CD ROM drives, or any number of other types of storage devices having media for storing data digitally. A read only memory (ROM) 206 is used to store digital data of a permanent basis, such as instructions for the microprocessors. Main memory 204 is used for storing digital data on an intermediate basis. Main memory 204 can be dynamic random access memory (DRAM).

Computer system 200 includes a typical 3D graphics rendering system 211. Processor 202 provides the graphics system 211 with graphics data, such as drawing commands, coordinate vertex data, and other data related to an object's geometric position, color, texture, shading, and other surface parameters. In this implementation, the object data is processed by graphics system 211 in the following four pipelined stages: geometry subsystem 231, scan conversion subsystem 232, raster subsystem 233, and a video subsystem 234. The geometry subsystem 231 converts the graphical data from processor 202 into a screen coordinate system. Geometry subsystem 231 performs projection and transformation processes to give depth to a displayed object. The resulting primitives (points, lines, polygons, polyhedra, and the like) supplied by the geometry subsystem 231 are then supplied to the scan conversion subsystem 232. Scan conversion subsystem 232 generates pixel data (e.g., fragments, fragment parameters, color information, and the like) based on these primitives. The scan conversion subsystem 232 also performs interpolation functions to interpolate straight lines so that each intermediate value need not be individually and separately calculated by the geometry subsystem. Next, the pixel data is sent to the raster subsystem 233, where Z-buffering, blending, texturing (using texture data stored in texture memory 236), and antialiasing functions are performed. The resulting pixel values are subsequently stored in frame buffer 235. The video subsystem 234 reads the frame buffer 235, gamma corrects the image information stored therein, and sends the image (in the correct format) to an optional display 221.

Several other optional devices may also be coupled to system 200. For example, an alphanumeric keyboard 222 is used for inputting commands and other information to processor 202. Another type of user input device is cursor control device 223 (a mouse, trackball, joystick, and the like) used for positioning a movable cursor and selecting objects on a computer screen. Another device which may be coupled to bus 201 is a hard copy device 224 (e.g., a laser printer) for printing data or other information onto a tangible medium. Additionally, a sound recording or video option 225 can be coupled to the system 200 to provide multimedia capabilities.

Figure 3:
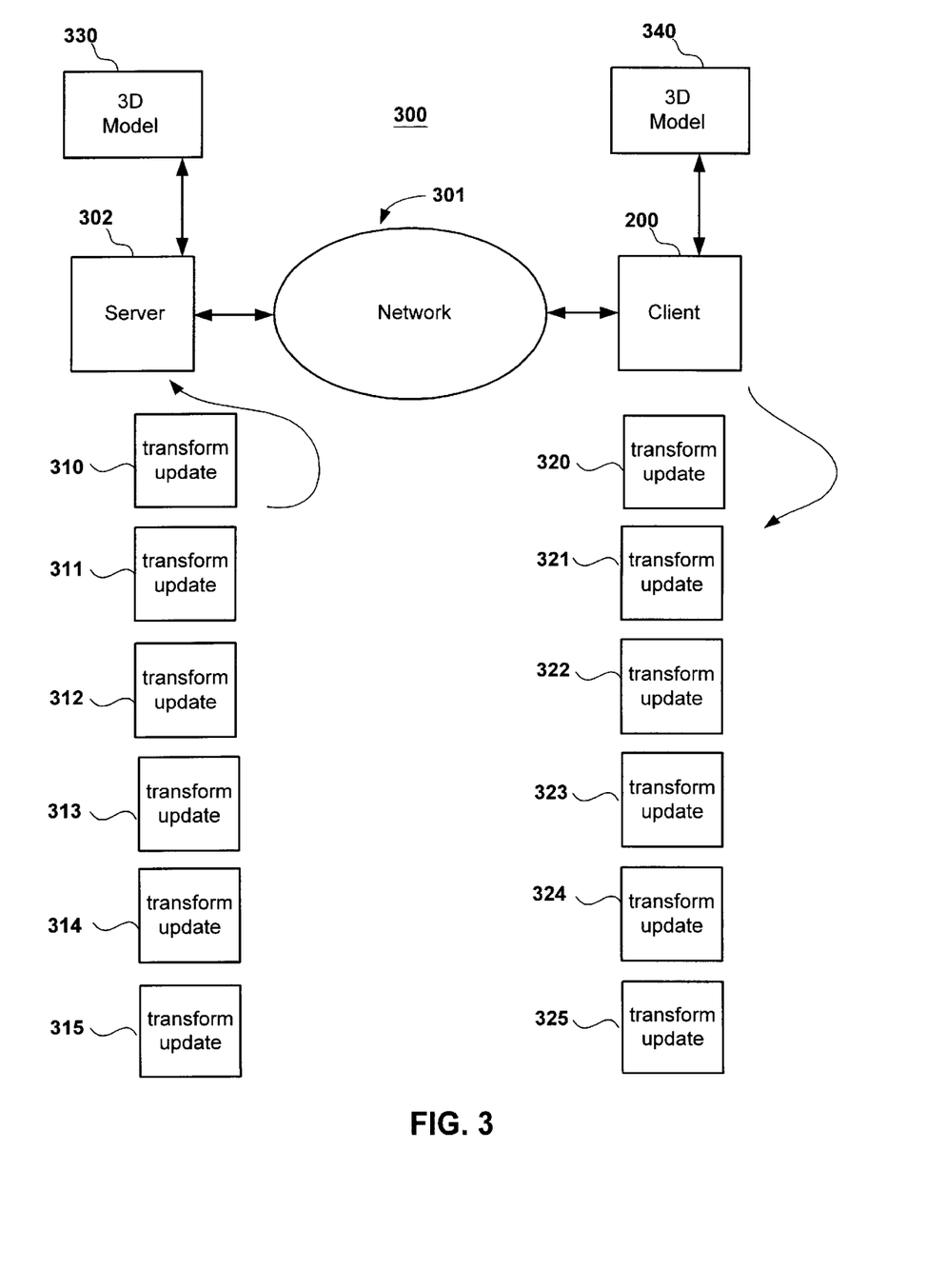
FIG. 3 shows a diagram of a client/server computer system for streaming 3D animation in accordance with one embodiment of the present invention.

FIG. 3 shows a diagram of a client/server computer system 300 in accordance with one embodiment of the present invention. As depicted in FIG. 3, system 300 includes a server 302 coupled to a client 200 via a network 301. Server 302 is typically a large digital computer system residing at the video applications site premises (e.g., an on-line video company). Client 200 is typically a desktop computer system at, for example, the user's home. In this embodiment, network 301 is the Internet and client 200 is coupled to the Internet via a narrow bandwidth connection (e.g., a dial-up modem).

In the present embodiment, system 300 functions as a client/server computer system for providing interactive 3D animation via the network 301 (e.g., the Internet). System 300 provides animation by bringing "life" to a 3D model hosted on the client computer system 200. A 3D model 340 is accessed on the client. The 3D model 340 is a representation of the Figure or scene to be animated (e.g., a 3D model of an athlete, an animal, a vehicle, etc.). The client then receives a series of transform updates 320–325 for the 3D model 340 via the network 301.

The series of transform updates 320–325 describe for the client 200 the manner in which to update the 3D model 340, and thereby implement the animation. The 3D model 340 is instantiated and rendered by dedicated rendering hardware (e.g., graphics subsystem 211) included in the client 200. Each of the series of transform updates 320–325 are applied by the client 200 to the 3D model 340 to render a corresponding series of 3D images. The series of rendered 3D images are then displayed to the user (e.g., via display 221) to provide a 3D animation.

Referring still to FIG. 3, the transform updates 320–325 are received by client 200 from server 302. Server 302 stores a corresponding series of transform updates 310–315. The transform updates 310–315 are derived from a corresponding 3D model 330. In this embodiment, 3D model 330 is instantiated within the server 302. Transform updates 310–315 describe the manner in which client 200 is to manipulate its corresponding model 340 to create the animation. Server 302 "streams" the animation to client 200 by serially transmitting transform updates 310–315 to client 200 via network 301. The transform updates 310–315 are received by client 200 as transform updates 320–325.

Streaming the transform updates 320–325 across the Internet is more bandwidth efficient than prior art methods such as streaming images using a series of image files. In accordance with present embodiment, the only image information that must be transmitted is the information required to manipulate 3D model 340. Transform updates 320–325, for example, describe joint positions, rotation positions, and the like of the various aspects of 3D model 340. These transform update files are much smaller than actual image files. The rendering of the image is performed by the client computer system 200 processing 3D model 340.

Transform updates 310–315 can be predetermined or can be generated in real-time. In a case where the animation for client 200 is a pre-stored, predetermined animation, the processing of 3D model 330 and a generation of transform updates 310–315 can take place at any time prior to streaming across network 301 (e.g., in a media development studio). In a case where the animation for client 200 is a real-time animation, transform updates 310–315 are generated in real-time by server 302. For example, 3D model 330 can be configured to accept "motion capture" inputs from an actor to generate realistic and lifelike movements. These movements are then resolved into transform updates 310–315 "on-the-fly", in real-time. Transform updates 310–315 are then streamed to client 200 in the manner described above.

System 300 is capable providing realistic interactivity with the user via the client 200. Interactivity is implemented by receiving user commands from the client 200 via the network 301. In response to the user commands, the server 302 appropriately alters the series of transform updates 310–315 streamed to the user, thereby providing interactivity to the 3D animation. Thus, for example, the user is able to interact with the 3D animation as the 3D animation "responds" to user inputs (e.g., mouse clicks, etc.). For example, in a case where the animation is real-time, an actor generating the motion capture inputs for model 330 can respond to the user inputs and thus directly control the animation viewed by client 200, making the animation respond to the user. Alternatively, where the animation is predetermined, a software program controlling the 3D model 330 (e.g., an artificial intelligence) can respond to the user inputs in any manner specified by the programmers, thereby providing substantial degree of interactivity.

System 300 is compatible with well-known widely used 3D rendering standards. One such standard is virtual reality modeling language (VRML). VRML is a standard for specifying a 3D scene on the Internet, or more particularly, the World Wide Web. VRML is embodied as a specification which is continually being developed by collaborative bodies of companies and individuals. The specification for VRML is tracked according to its version numbers, for example, as VRML 1.0, and is well-known and widely used. As used by the present invention, for example, VRML modeling is implemented in system 300 to define a "virtual reality" through which 3D animation can be presented to and interact with a user. For example, system 300, using 3D model 340, can generate an environment through which a user can navigate and interact. VRML specifications providing standardized method for defining models for various types of computer systems.

Figure 4:
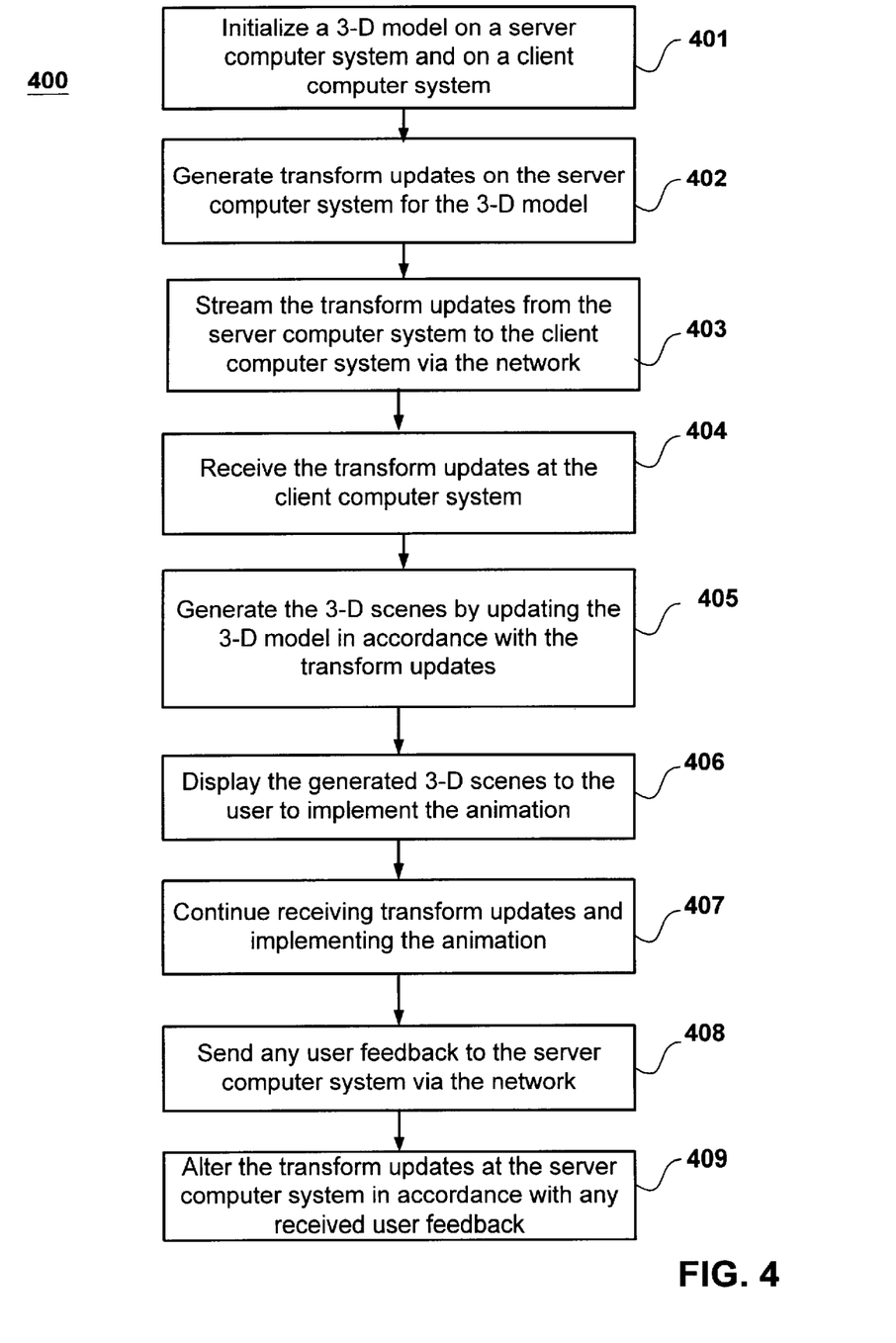
FIG. 4 a flow chart of the steps of a 3D streaming animation process in accordance with one embodiment the present invention.

Referring now to FIG. 4, a flow chart of the steps of a process 400 in accordance with one embodiment the present invention is shown. As depicted in FIG. 4, process 400 shows the operating steps of the 3D streaming animation process as performed by, for example, system 300 of FIG. 3.

Process 400 begins in step 401, with the initialization of respective 3D models (e.g., 3D models 330 and 340) on a server computer system (e.g., server 302) and a client computer system (e.g., client 200). In step 402, transform updates (e.g., transform updates 310–315) are generated on the server computer system for its respective 3D model. As described above, the transform updates describe the manner in which the client computer system is to manipulate its respective 3D model in order to implement the 3D animation. In step 403, the transform updates generated by the server computer system are streamed to the client computer system via the network (e.g., network 301). As described above, connections to network 301 for most users are narrow-band type connections.

In step 404, the transform updates are received at the client computer system. In step 405, 3D scenes are generated by the client computer system by updating its respective 3D model in accordance with the transform updates (e.g., transform updates 320–325). As described above, the client computer system is able to synthesize the 3D scene by manipulating the 3D model. Hence, resulting 3D images required for the animation are obtained without having to download them across the network. In step 406 the client computer system displays the generated 3D scenes to the user, thereby implementing the animation.

In step 407, the client computer system continues receiving transform updates from the server in continues implementing the animation, thereby maintaining the streamed animation. In step 408, any user feedback (e.g., mouse clicks, etc.) is sent back to the server computer system from the client via the network. Subsequently, in step 409, the server computer system alters the transform updates prior to streaming to the client in accordance with any received user feedback. As described above, interactivity is provided by altering the transform updates in accordance with user commands. This allows the user to influence, for example, the movement of the character defined by the 3D model.

Figure 5:
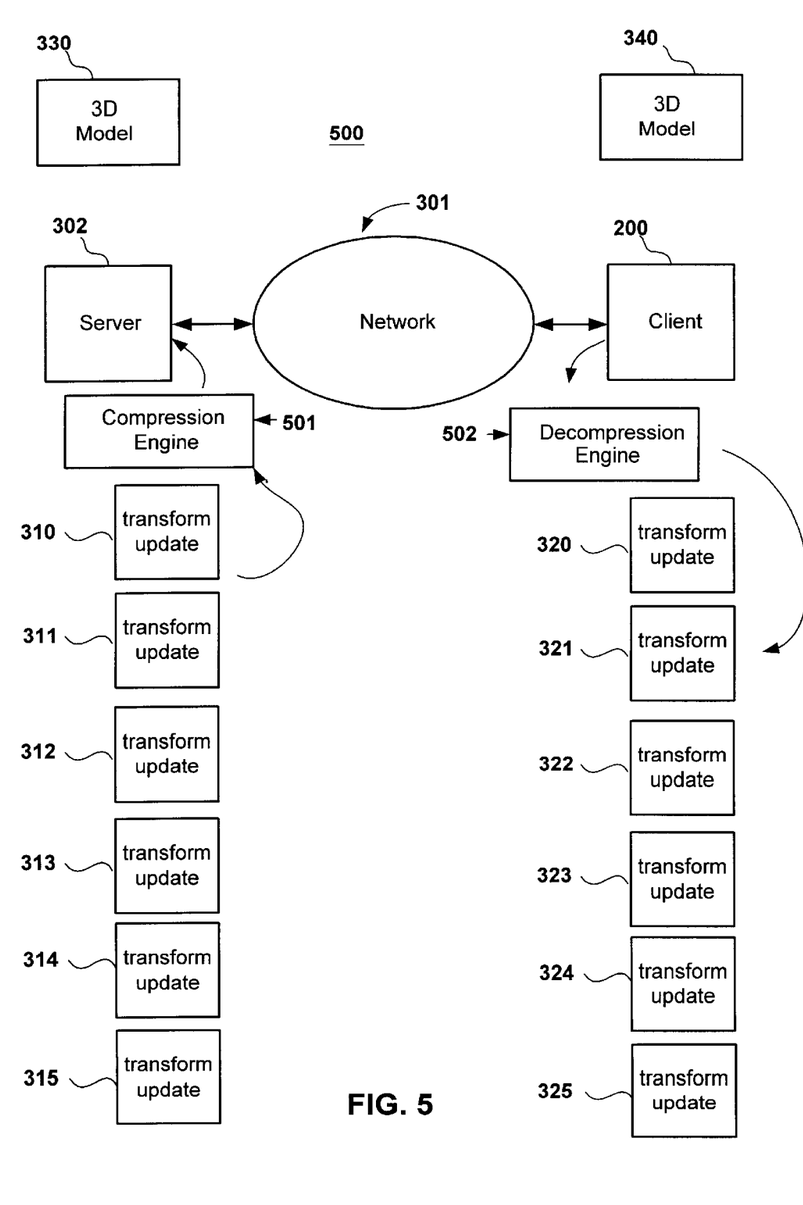
FIG. 5 shows a client/server computer system for streaming 3D animation in accordance with an alternative embodiment of the present invention.

FIG. 5 shows a client/server computer system 500 in accordance with an alternative embodiment of the present invention. As depicted in FIG. 5, system 500, in the same manner as system 300 FIG. 3, includes server 302 coupled to client 200 via network 301. In this embodiment, system 500 uses a compression engine 501 to compress transform updates 310–315 prior to transmission to client 200 via network 301. Client 200 uses a decompression engine 502 to decompress the compressed transform updates, resulting in transform updates 320–325.

In this embodiment, the use of compression and decompression provides an additional degree of efficiency. The transform updates 310–315 are compressed prior transmission from the server 302 to the client 200. The compressed transform updates are then decompressed by the client 200. After decompression, the resulting transform updates 310–325 are used to render a corresponding series of 3D images in the manner described above. In so doing, system 500 is even more capable of providing high-quality, interactive 3D animation over narrow data pipes of the Internet.

Referring still to FIG. 5, it should be noted that high-quality real-time animation of the synthesized 3D objects (e.g., 3D model 340) requires the efficient streaming of the animation data (e.g., transform updates 320–325) to be streamed to client 200 to reduce the time required for the initial download. To maintain high-quality animation; it is necessary to perform aggressive compression on the transform updates.

For example, in one embodiment, a 3D VRML character is defined having 54 joints which are formed of SFRotation (40), SFVec3f (13), and SFFloat (1). The SFRotation (40), SFVec3f (13), and SFFloat (1) VRML data types consist of 16, 12, and 4 bytes respectively. To enable smooth animation, transform update data has to be transmitted at a rate equivalent to more than 10 frame per second (fps). For example, in a case where animation is sent a rate equal to 12 frames per second, without compression, the transmission data rate will be approximately:

(16*40+12*13+4)*12*8=76800 bps

However, the animation data is required to fit into a data rate of no more than 14 Kbps in order to fit into the narrow data pipe of a typical modem (e.g., 28.8 kbps) with the inclusion of synchronized sound information.

To perform aggressive compression required, system 500 takes advantage of the fact that 3D model 340 has a defined and predictable manner of movement. For example, in a case where 3D model 340 is human character, the 3D character has a bone skeleton and a predefined manner and range of movement. System 500 uses the inverse kinematics method known in the character animation arts. This will reduce the character down to one location vector (SFVec3f) which is located at, for example, the pelvis, and other bone locations can be calculated in relation to the bone kinematics and the rotation (SFRotation) from the pelvis. This is due to the fact that rotation space is more limited compared to the location space which is virtually unlimited.

Rotation will be compressed converting into the polar system, then quantifying into 8 bit space. This will reduce the 16 bytes rotation into 3 bytes compressed. Further compression is achieved, for example, by limiting the transmission of data to only those channels with perceived change from the previous frame. To maintain fidelity, a "reference frame" is periodically inserted so that system 500 can calibrate itself. This is done to avoid, for example, excessive drifting due to packet loss type problems.

With respect to the location vector, in a preferred embodiment, system 500 compresses the location vector using 16 bit quantification, which reduces the location vector from 12 bytes to 6 bytes.

In this manner, system 500 of the present embodiment avoids the inherently bandwidth intensive drawbacks of prior art GIF animation and MPEG animation schemes. These prior art schemes essentially have the animation scene pre-rendered. This is inherently bandwidth intensive since it is not utilizing the semantic knowledge of the 3D scene. Further the scene is not navigable since the scene is not synthesized on the client 200. System 500 avoids these problems. The streaming of transform updates is inherently bandwidth efficient, thereby enabling high-quality, interactive animation over narrow bandwidth network connections to the Internet available to most users.

Thus, system 500 of the present embodiment implements a method for interactive synthesized 3D graphics. System 500 takes advantage of the dedicated graphics rendering technology becoming increasingly available in most desktop computer systems. The 3D animation streaming process of the present invention provides a method for making the most vivid of these 3D characters.

Interactivity is implemented by receiving user commands from the client via the network. In response to the user commands, the server appropriately alters the series of transform updates streamed to the user, thereby providing interactivity to the 3D animation. Thus, for example, the user is able to interact with the 3D animation as the 3D animation "responds" to user inputs (e.g., mouse clicks, etc.).

Figure 6:
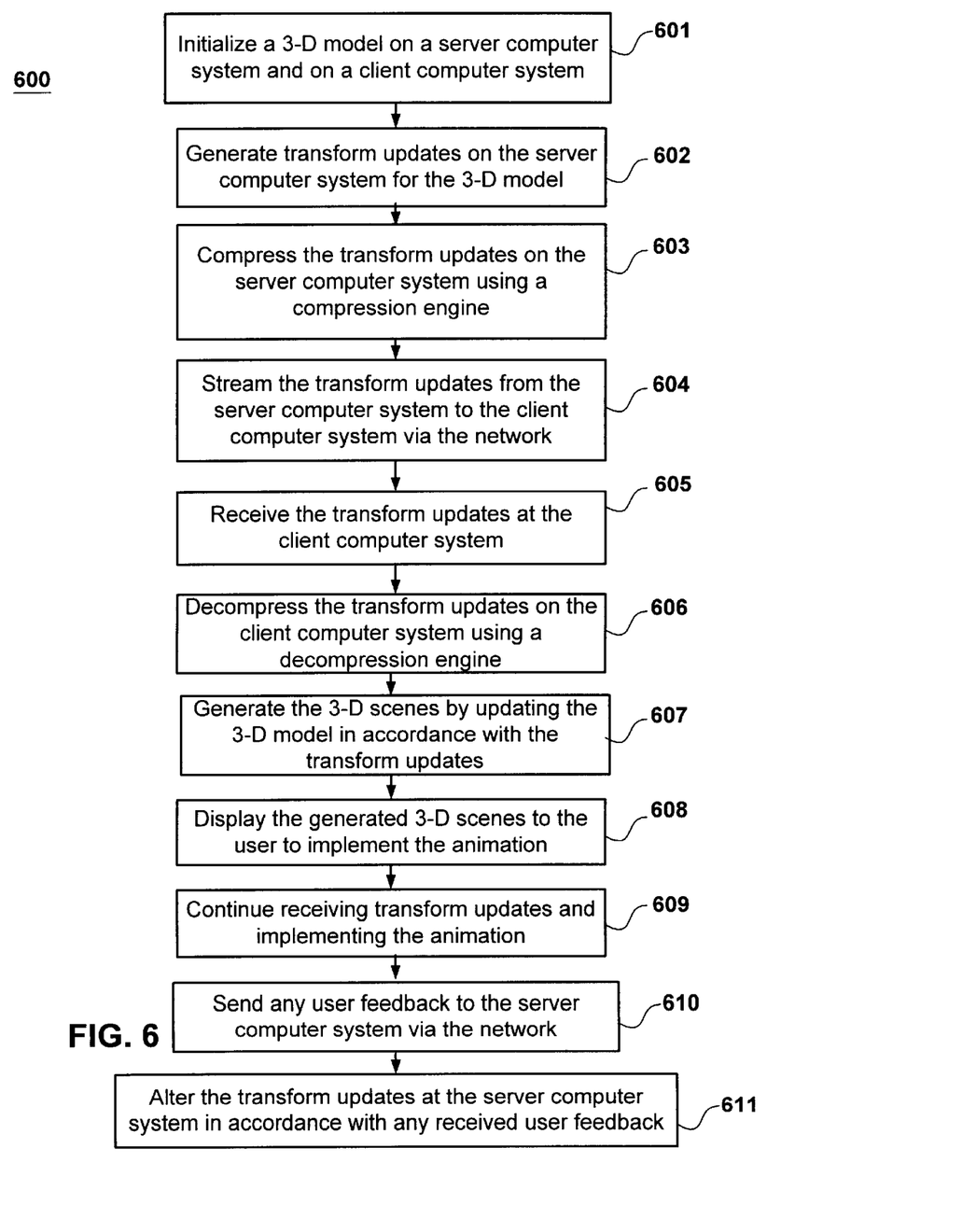
FIG. 6 a flow chart of the steps of a 3D streaming animation process in accordance with one embodiment the present invention.

Referring now to FIG. 6, a flow chart of the steps of a process 600 in accordance with one embodiment the present invention is shown. As depicted in FIG. 6, process 600 shows the operating steps of the 3D streaming animation process as performed by, for example, system 500 of FIG. 5, wherein compression is performed on the transform updates prior to streaming them from the server to client.

Process 600 begins in step 601, with the initialization of respective 3D models (e.g., 3D models 330 and 340) on a server computer system (e.g., server 302) and a client computer system (e.g., client 200). In step 602, transform updates (e.g., transform updates 310–315) are generated on the server computer system. In step 603, the transform updates on the server computer system are compressed using a compression engine. As described above, system 500 takes advantage of the fact that 3D model 340 has a defined and predictable manner of movement. For example, in a case where 3D model 340 is human character, the 3D character has a bone skeleton and a predefined manner and range of movement. This enables aggressive compression to be performed.

In step 604, the compressed transform updates generated by the server computer system are streamed to the client computer system via the network (e.g., network 301). In step 605, the compressed transform updates are received at the client computer system. Then, in step 606, the compressed transform updates are decompressed on the client computer system using decompression engine. In step 607, 3D scenes are generated by the client computer system by updating its respective 3D model in accordance with the decompressed transform updates (e.g., transform updates 320–325). In step 608 the client computer system displays the generated 3D scenes to the user, thereby implementing the animation. In step 609, the client computer system continues receiving compressed transform updates from the server and continues decompressing and implementing the animation. In step 610, any user feedback (e.g., mouse clicks, etc.) is sent back to the server computer system. Subsequently, in step 611, the server computer system alters the transform updates prior to compressing and streaming them to the client in accordance with any received user feedback.

Thus, the present invention provides a method and system for implementing high-quality animation over narrow bandwidth network connections. The system of the present invention is capable of providing high quality animation over the typically narrow data pipes of the Internet. The system of the present invention maintains interactivity without impacting the animation quality. In addition, the present invention provides a system capable of providing 3D animation and interactivity. In one embodiment, the present invention is implemented as client/server computer system for providing interactive 3D animation via a network.

What is claimed is:

1. A method for providing 3D animation to computer systems coupled to a network, comprising:
   a) accessing a 3D model on a client;
   b) receiving a series of transform updates for the 3D model on the client via a network, the series of transform updates received from a server, wherein each of the series of transform updates comprises a location vector and a rotation;
   c) rendering a corresponding series of 3D images by applying the series of transform updates to the 3D model using the client; and
   d) displaying the corresponding series of rendered 3D images to a user to provide a 3D animation.

2. The method of claim 1, wherein the location vector is compressed by quantification and the rotation is compressed by conversion to polar system and by quantification.

3. The method of claim 2, wherein the rotation is wherein the location vector is compressed by quantification into not more than six bytes and the rotation is compressed by conversion to polar system and by quantification into not more than three bytes.

4. The method of claim 1 wherein the 3D model is a VRML model.

5. The method of claim 1 further comprising the steps of:
   receiving user commands from the client via the network; and
   altering the series of transform updates in accordance with the user commands to provide interactivity to the 3D animation.

6. The method of claim 1 further including the steps of:
   generating the series of transform updates using a 3D model accessed by the server; and
   streaming the series of transform updates from the server to the client in real time.

7. The method of claim 1 further including the steps of:
   compressing the transform updates using a compression engine running on the server;
   transmitting the compressed transform updates across the network to the client; and
   decompressing the compressed transform updates using a decompression engine running on the client.

8. The method of claim 1 further including the steps of:
   accessing a 3D model using the server; and
   generating the series of transform updates by applying motion capture data to the 3D model.

9. The system of claim 1 wherein the 3D model is a VRML (virtual reality modeling language) model.

10. The system of claim 1 further comprising the steps of:
receiving user commands from the client via the network; and
altering the series of transform updates in accordance with the user commands to provide interactivity to the 3D animation.

11. The system of claim 1 further including the steps of:
generating the series of transform updates using a 3D model accessed by the server; and
streaming the series of transform updates from the server to the client in real time.

12. The method of claim 1, wherein each of the series of transform updates includes inverse kinematics information corresponding to the model.

13. The method of claim 12, wherein the inverse kinematics information includes a joint position and a rotation position corresponding to the model.

14. The method of claim 12, wherein the inverse kinematics information includes a location vector and a rotation position corresponding to the model.

15. The method of claim 1, wherein each transform update comprises a single location vector and a single rotation associated with the 3D model.

16. A method for providing streaming 3D animation across a network using a client/server computer system, the method comprising the steps of:
accessing a 3D model on a client;
compressing a series of transform updates for the three model using a compression algorithm, wherein each of the series of transform update comprises a location vector and a rotation;
transmitting the series of compressed transform updates from the server to the client via a network;
decompressing the series of compressed transform updates using the client;
rendering a corresponding series of 3D images by applying the decompressed series of transform updates to the 3D model using the client; and
displaying the corresponding series of rendered 3D images to a user to provide 3D animation.

17. The method of claim 16, wherein compressing the series of transform updates comprises quantifying the location vector and converting the rotation to polar system and quantifying the polar system rotation.

18. The method of claim 17, wherein the location vector is compressed by quantification into not more than six bytes and the rotation is compressed by conversion to polar system and by quantification into not more than three bytes.

19. The method of claim 16 wherein the 3D model is a VRML model.

20. The method of claim 16 further comprising the steps of:
receiving user commands from the client via the network; and
altering the series of transform updates in accordance with the user commands to provide interactivity to the 3D animation.

21. The method of claim 16 further including the steps of:
generating the series of transform updates using a 3D model accessed by the server; and
streaming the series of transform updates from the server to the client in real time.

22. The method of claim 16 further including the steps of:
accessing a 3D model using the server; and
generating the series of transform updates by applying motion capture data to the 3D model.

23. The method of claim 16, wherein each of the series of transform updates includes inverse kinematics information corresponding to the model.

24. The method of claim 23, wherein the inverse kinematics information includes a joint position and a rotation position corresponding to the model.

25. The method of claim 23, wherein the inverse kinematics information includes a location vector and a rotation position corresponding to the model.

26. The method of claim 16, wherein each transform update comprises a single location vector and a single rotation associated with the 3D model.

27. A computer system for implementing streaming 3D animation via a network, comprising:
a client computer system having a processor coupled to a memory, the memory storing software which when executed by the computer system cause the client to perform the steps of:
a) accessing a 3D model on a client;
b) receiving a series of transform updates for the 3D model on the client via a network, the series of transform updates received from a server, wherein each of the series of transform updates comprises a location vector and a rotation;
c) rendering a corresponding series of 3D images by applying the series of transform updates to the 3D model using the client; and
d) displaying the corresponding series of rendered 3D images to a user to provide a 3D animation.

28. The system of claim 27, wherein the location vector is compressed by quantification and the rotation is compressed by conversion to polar system and by quantification.

29. The system of claim 28, wherein the location vector is compressed by quantification into not more than six bytes and the rotation is compressed by conversion to polar system and by quantification into not more than three bytes.

30. The system of claim 27 further including the steps of:
compressing the transform updates using a compression engine running on the server;
transmitting the compressed transform updates across the network to the client; and
decompressing the compressed transform updates using a decompression engine running on the client.

31. The system of claim 27 further including the steps of:
accessing a 3D model using the server; and
generating the series of transform updates by applying motion capture data to the 3D model.

32. The system of claim 27, wherein each of the series of transform updates includes inverse kinematics information corresponding to the model.

33. The system of claim 32, wherein the inverse kinematics information includes a joint position and a rotation position corresponding to the model.

34. The system of claim 32, wherein the inverse kinematics information includes a location vector and a rotation position corresponding to the model.

35. The system of claim 27, wherein each transform update comprises a single location vector and a single rotation associated with the 3D model.

* * * * *